Aug. 26, 1969    M. PETRY ET AL    3,463,504
WHEELED BABY SEAT

Filed Aug 18, 1967    3 Sheets-Sheet 1

Aug. 26, 1969  M. PETRY ET AL  3,463,504

WHEELED BABY SEAT

Filed Aug 18, 1967  3 Sheets-Sheet 2

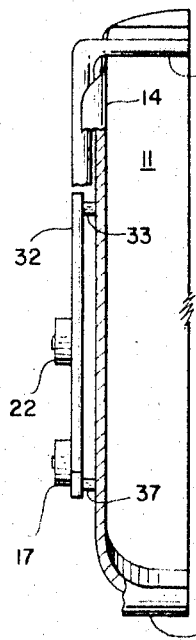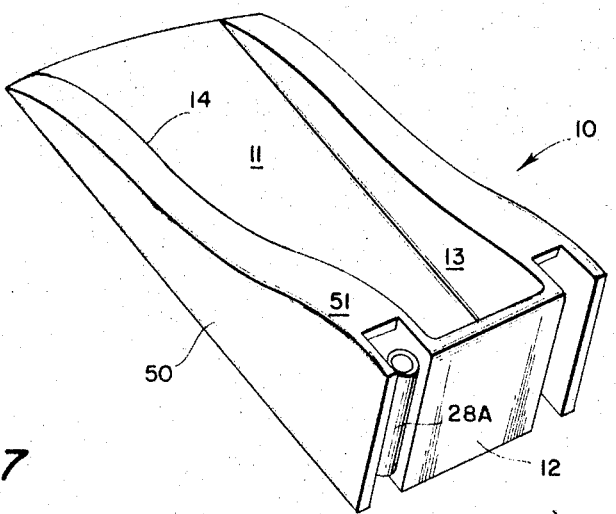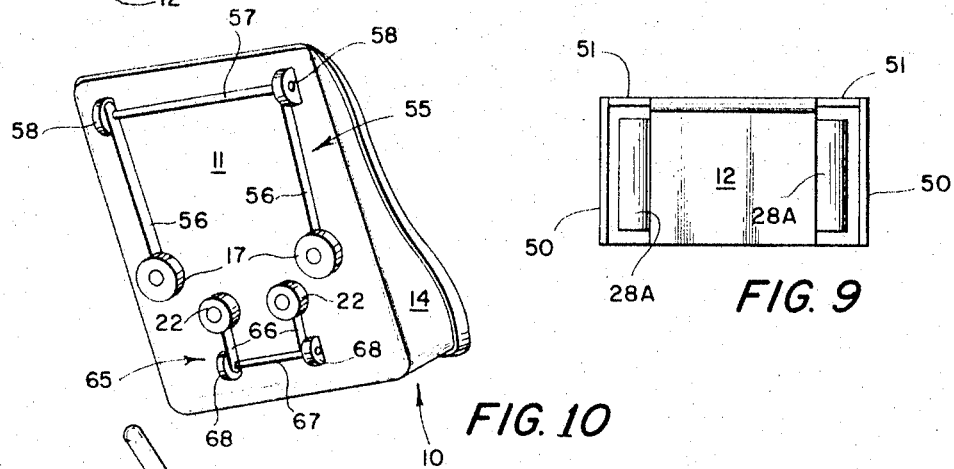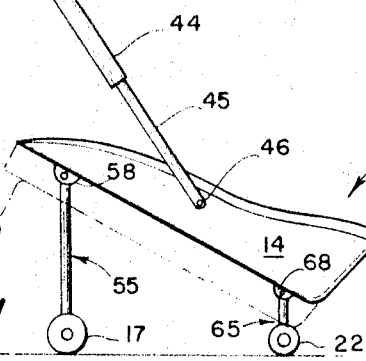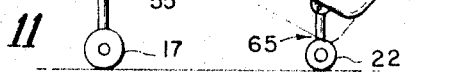

3,463,504
WHEELED BABY SEAT
Marvin Petry and Marilyn Belle Petry, both of 10232
 Rockville Pike, Rockville, Md. 20853
Filed Aug. 18, 1967, Ser. No. 661,654
Int. Cl. B62b 7/12, 1/04, 3/02
U.S. Cl. 280—31                    9 Claims

ABSTRACT OF THE DISCLOSURE

A baby seat of the type having a back, a base and opposed sides and designed for infants too young to sit or to stand; including a frame structure movable between at least a first position whereat the elements of the frame are withdrawn to permit normal manually carrying of the baby seat, and a second position whereat the elements of the frame are extended to permit transportation of the baby seat along the ground.

BACKGROUND OF THE INVENTION

Field of the invention

This invention relates to baby seats of the type designed to carry an infant too young to sit or to stand alone, and in particular it relates to such a baby seat modified to permit the same to be transported along the ground.

Description of prior art and problem underlying invention

In recent years there has been developed a seat designed specifically for an infant under six to eight months of age, or before the infant becomes capable of sitting up on his own. Such a device is shown, for example, in the Letters Patent No. 2,324,421, to Alfred J. Ouellette, issued July 13, 1943. This type of seat, which will be referred to hereinafter as a "baby seat" is to be distinguished from other children's seats such as a car seat or a stroller which are designed for the child capable of sitting up alone.

The "baby seat" to which the present invention pertains, is carefully designed to support the back, neck, head and buttocks of the infant while at the same time permitting normal bending of the infant's knees at the free edge of the base. Both for enhancing the normal healthy development of the baby and for the purpose of convenience, the baby seat should carry out its support functions while the back of the baby seat is inclined at an angle other than 90°, that is tilted up, relative to the support surface on which the baby seat is placed.

Baby seats of this nature generally include a back, a base located at one end of the back and oriented generally at right angles to the back, and a pair of opposed side panels each connected to both the back and the base. Normally, the side panels will taper towards the back as they progress away from the base thereby permitting room for freedom of movement of the infant's arms and hands.

The development of the baby seat, per se, has permitted mothers or other baby attendants new freedom and mobility. With the baby seat it was possible to set the infant down anywhere rather than hold the infant in the arms or prop the infant up on specially arranged pillows.

However, with all baby seats known heretofore, mobility with the pre-sitting age infant remained seriously impaired. When moving about, while shopping, etc., it was still necessary to carry the infant in the baby seat. While baby seats themselves may be constructed to be very lightweight (for example, they may be moulded out of a plastic material and weigh less than two pounds) there is obviously no way to avoid carrying the weight of the infant himself. This is an extra load of approximately seven to twenty pounds and this is simply too much for any women for any extended period of time. Consequently, for such women, mobility with the infant is simply eliminated or seriously impaired until the child is capable of sitting up alone.

The only known attempt to solve this immobility problem has been to place the baby seat into a wheeled structure such as a stroller. However, this procedure does not solve the problem, it only changes it. Now the woman has the added burden of carrying around the stroller as well as the baby and the baby seat during those situations where the stroller cannot be used.

Thus, considering the state of the art heretofore, there remains a significant impairment to full mobility with the pre-sitting age infant.

SUMMARY OF THE INVENTION

Thus, the purpose of the present invention is to provide a new and improved baby seat which radically increases freedom and mobility for the attendant of a pre-setting age infant.

According to the present invention there is provided a baby seat having formed thereon specifically designed frame structure elements arranged for movement at least between two basic positions, a withdrawn position and an extended position. In the withdrawn position the frame structure elements are withdrawn compactly against the outer surface of the baby seat thereby permitting full and normal use of the baby seat as known heretofore, including simplified manual carrying of the baby seat and including the employment of known adjustable tilting devices for convenience in feeding, etc. In the extended position the wheel frame elements are moved downwardly to support the baby seat at a level above the ground thereby permitting movement of the baby seat along the ground while requiring no structure other than that frame structure which was held compactly against the exterior surface of the baby seat when the frame structure was in the withdrawn condition.

For stability it is preferable to keep the baby seat only a short distance off of the ground; for example, less than two feet. Consequently, it is preferable to employ with the frame structure a handle extending upwardly from the baby seat to a height convenient for permitting the attendant to push the baby seat in front of her without stooping over. This handle, like the wheel frame structure, would be designed for movement between a withdrawn position in close proximity to the outer surface of the baby seat, thereby permitting normal operation of the baby seat as known heretofore, and an extended position whereat the handle extends to the said convenient height.

Thus, a goal of the invention is to provide a baby seat which retains all of its previous advantages and functions while adding still other substantially new and un-obvious functions.

The frame structure comprises a plurality of legs connected to the seat at one end and having a wheel at the other end, the legs being movable between the said extended and withdrawn positions. While the actual number of legs or wheels is of course variable within the scope of the invention, a plurality of legs, normally three or four, would be preferable to maximize both stability and economy.

When the frame structure is in the extended position the back of the baby seat could assume any orientation, that is, either horizontal (parallel with the ground) or tilted very close to a line perpendicular to the ground.

However, it is preferable that the back be retained at an intermediate angle between the horizontal and vertical. This is accomplished by making the front legs (those closest to the end of the back farthest from the base) longer than the back wheels. Of course, the front legs can be adjustable to any height thereby permitting variation of the orientation of the seat, during transportation, to many positions between horizontal and vertical.

In one form of the invention, the baby seat includes two forward legs and two rearward legs, all of which are attached to the opposed side panels of the baby seat. In one embodiment of this form the legs open up telescopically from the withdrawn position to the desired length for movement along the ground. In another embodiment of this form the legs fold up from their extended positions in a manner similar to the legs of a card table to positions alongside the outer surface of the side panels.

The arrangement for withdrawing the frame structure along the side of the baby seat has the advantage that the back of the seat is left free for the employment of known adjustable tilting mechanisms. Of course, it is also possible to employ the frame structure of the present invention as an adjustable tilting mechanism for feeding the baby, etc., by employing telescopic forward legs capable of being fixed at a plurality of heights between the withdrawn and extended positions.

However, it is also possible within the scope of the invention to mount the frame structure behind the back rather than along the side panels.

In any form of the invention, since for stability the seat should not be more than two feet off of the ground, it is also contemplated to employ a handle means which is movable from a withdrawn position along the outer surface of the baby seat to an extended position upwardly to a height convenient for the person attending the baby. Preferably, the handle will extend to a point rearward of the rear wheels (as defined above) so that the baby seat can be pushed with the head of the baby foremost and the attendant rearward of the seat. This handle may be moved by pivotal means between the withdrawn and extended positions, or the handle may be formed in two parts, each movable telescopically between the withdrawn and extended positions.

Thus, it is an object of this invention to provide a new and improved baby seat of the type designed for infants of pre-sitting age wherein the design permits increased mobility.

It is another object of this invention to provide a baby seat of the type for use with pre-sitting stage infants including a frame structure having wheels mounted rotatably thereon, the frame structure being movable between a withdrawn position to permit normal use of the baby seat as known heretofore, and an extended position to permit transporting the baby seat along the ground.

It is another object of this invention to provide a baby seat of the type used for pre-sitting age infants having a plurality of elements including means for mounting wheels and means including a handle wherein the elements are movable between a first position with all of the elements withdrawn thereby permitting normal use of the baby seat and a second position whereby the wheels are extended downwardly and the handle is extended upwardly to permit transporting the baby seat along the ground.

Other objects and the attendant advantages of the present invention will become apparent from the detailed description to follow together with the accompanying drawings.

BRIEF DESCRIPTION OF THE DRAWINGS

There follows a detailed description of preferred embodiments of the invention to be read together with the accompanying drawings. However, it is to be understood that the invention is capable of numerous modifications and variations apparent to those skilled in the art without departing from the spirit and scope of the invention.

In the drawings:

FIGURE 7 is a partial sectional view taken along line 7—7 of FIGURE 6.

FIGURE 8 illustrates a modification for use with either of the embodiments of FIGURES 1 or 4.

FIGURE 9 is an end view taken in the direction of arrow 9 of FIGURE 8.

FIGURE 10 illustrates still another embodiment of the invention with the frame structure elements shown in the withdrawn position.

FIGURE 11 is a side elevational view of the embodiment of FIGURE 10 with the frame structure shown in the extended position.

DETAILED DESCRIPTION OF THE PREFERRED EMBODIMENTS

In the several embodiments shown in FIGURES 1–11 like numerals will be employed to indicate like parts.

Figure 1:
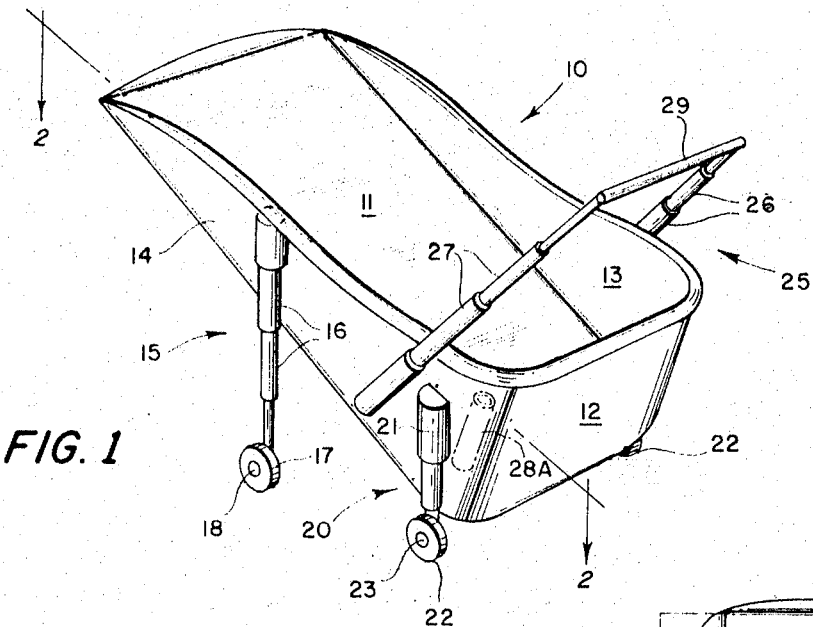
FIGURE 1 is a perspective view illustrating a first embodiment of the invention with the frame structure elements in the extended position.
Figure 2:
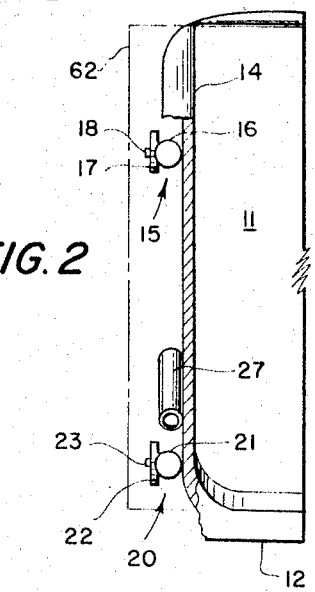
FIGURE 2 is a partial sectional view taken along line 2—2 of FIGURE 1.
Figure 3:
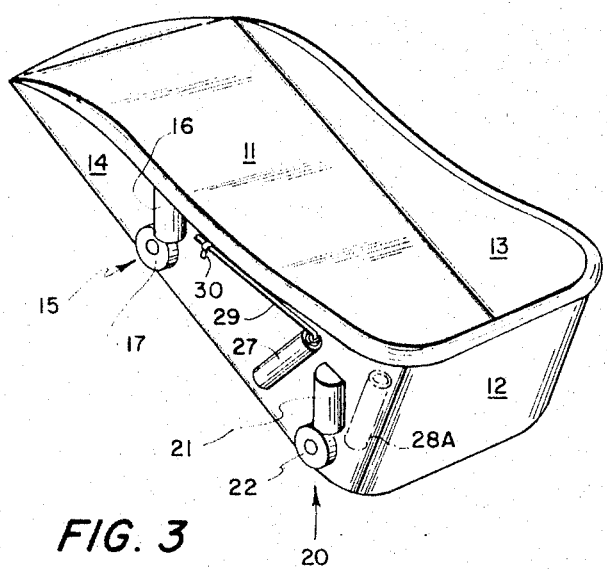
FIGURE 3 illustrates the embodiment of FIGURE 1 with the frame structure elements in the withdrawn position.

Referring to FIGURES 1–3, and in particular to FIGURE 1, there is shown a first embodiment of the invention. In this embodiment there is shown a baby seat 10 having a generally straight back portion 11 and a base 12 connected to the back and oriented at a generally right angle thereto. Connected to both the back 11 and the base 12 are a pair of opposed side panels 13 and 14. The width of these panels (the dimension taken in a direction perependicular to the plane of the back) is generally greatest at a point close to the base, after which the width of the side panels taper off towards the head portion of the back. The purpose of this is to provide adequate support in the base area for the baby's buttocks which rests against the lower portion of the back and the base 12, while permitting some freedom for the baby's arms and hands to move laterally past the upper portion of the side panels. The width of the base 12 (the distance in a direction perpendicular to the plane of the base 11) is short enough to permit the lower portion of the infant's legs to ertend out of the baby seat for normal movement.

The embodiment of FIGURE 1 includes a pair of front legs 15 and a pair of back legs 20, only one of each of which is fully visible in the figures. Each front leg includes a plurality of telescoping sections 16 which are arranged to move from the extended position of FIGURE 1 to the retracted position of FIGURE 3. The upper portion 16 will be rigidly secured to the outer surface of the side panels 13 and 14, respectively, and suitable means may be employed to lock each of the telescoping portions in the extended positions or any intermediate position. Such locking mechanisms are known per se and will not be described in detail. However, by way of example, each telescoping section could have affixed thereto a pin movable in a longitudinal slot in an adjacent section; and the slot could include a number of circumferentially extending notches. In this manner, relative longitudinal movement of the said two adjacent telescopic portions could be prevented by moving the pin into one of the notches. The lower telescopic portion 16 would have a wheel 17 mounted thereon for rotary movement about an axis pin 18.

Similarly, the rear legs 20 have telescopic portions 21 similar to portions 16, except that fewer would normally be required since the rear legs 20 would not normally extend as far as the front legs 15. This is desirable under normal circumstances so that the baby seat may be transported in the tilted up position. The rear legs 20 include wheels 22 mounted for rotary movement about axis pins 23.

For purposes of stability it is desirable to transport the baby seat at a level fairly close to the ground, for example, less than two feet. However, it would be quite inconvenient for one to bend over each time that it was desired to move the seat. Therefore, the invention also includes a handle means adapted to extend upwardly to a convenient level for the attendant.

In the embodiment of FIGURES 1 and 3 there is shown telescoping sections 26 and 27 adjacent side panels 13 and 14. These elements may be extended to any convenient height in the same manner as the portions 16, as described above, and connected together by a handle 29 as shown in FIGURE 1. As illustrated in FIGURE 3, the telescoping sections may be withdrawn. In this embodiment the cross-handle 29 is connected to the uppermost of the sections 27 so that in the withdrawn condition the handle 29 can also be placed along the outside of side panel 14 and held in place by a suitable latch 30.

FIGURES 4–7 illustrate another embodiment of the present invention. The baby seat shown in these figures is identical to that of the first embodiment of FIGURES 1–3, so that like numerals are used to designate like parts. Also, like numerals are employed to designate, generally, the front legs 15, the back legs 20 and the handle 25.

Figure 4:
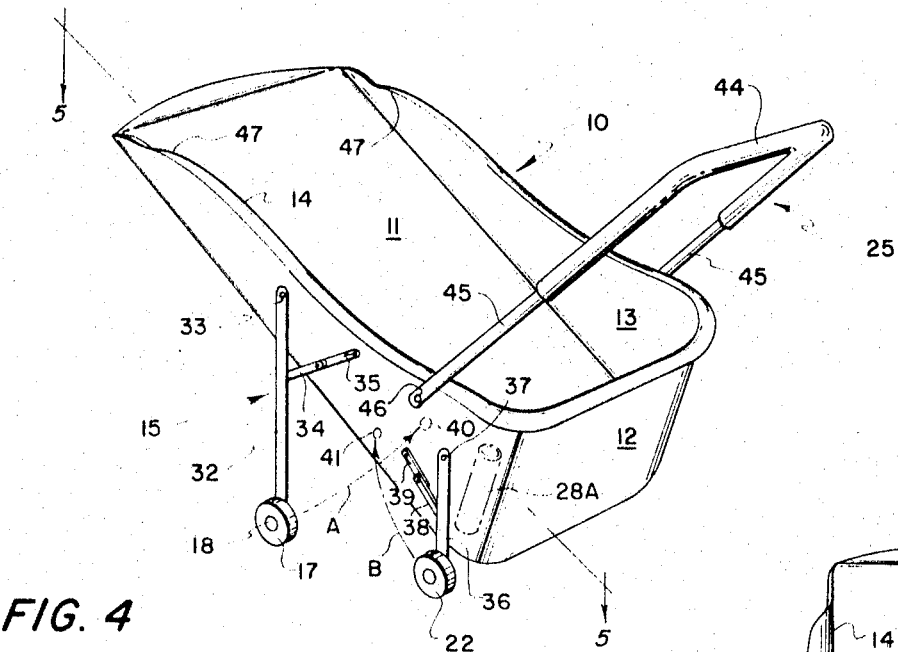
FIGURE 4 illustrates another embodiment of the invention with the frame structure elements in the extended position.
Figure 5:
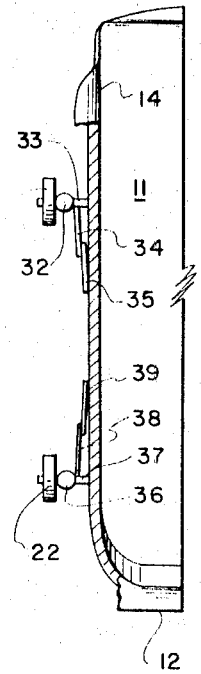
FIGURE 5 is a partial sectional view taken along line 5—5 of FIGURE 4.

The embodiment of FIGURE 4 includes a pair of rigid forward legs 32 connected to the side panel 14 at pivot axis 33 for pivotable movement thereabout. A suitable means such as brace 34 is connected to side panel 14 at point 35. This brace may be of the known type such as that employed with a folding card table. In this embodiment the rear legs 20 may also comprise rigid portions 36 which will normally be shorter than rigid portions 32 so that when the legs are in the extended position the back 11 will be tilted upwardly. This rigid leg portion 36 is connected at pivot axis 37 for rotational movement thereabout and held in place by brace 38 similar to brace 34, connected to the side wall 14 at point 39. Dotted line A in FIGURE 4 illustrates the path of the wheel 17 as it moves from the extended position to the folded position and point 40 represents the locus of axis 18 when the front leg 15 is withdrawn. Similarly, dotted line B represents the path of wheel 22 and point 41 represents the locus of point 23 when the rear leg is withdrawn.

The handle 25 may also be of the pivotable type rather than the telescopically slidable type. In this case, the handle would include sides 45 connected to the side of the baby seat at 46 and an upper portion 44 connecting together the two sides 45. Portion 44 may be movable telescopically relative to the lower portions 45 for height adjustment. In this embodiment the handle 44 could rest at the uppermost portion of the back, preferably in recesses 47 formed in the upper ends of he side panels 13 and 14 in the withdrawn position. In addition, sides 45 could be connected at 46 with a pin and notch means whereby the pin and notch engage at various positions to lock the sides 45 at various angular positions including the extended position (for pushing the baby seat along the ground), the withdrawn position, and suitable intermediate positions.

Figure 6:
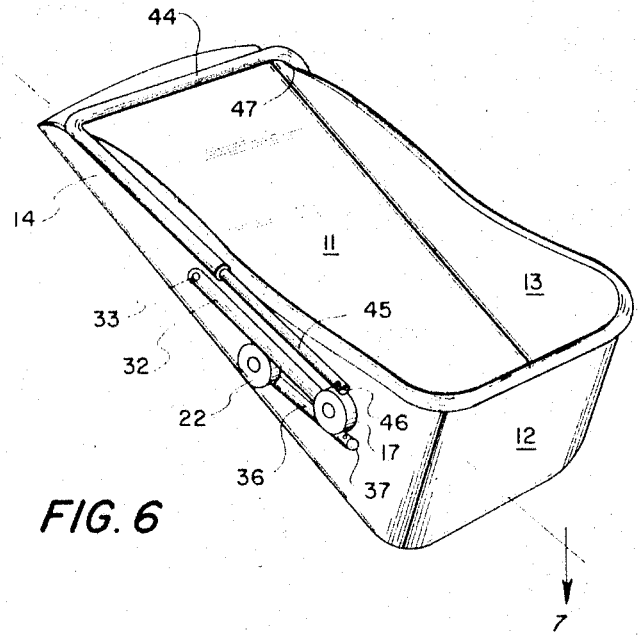
FIGURE 6 illustrates the embodiment of FIGURE 4 with the frame structure elements in the withdrawn position.

FIGURE 6 illustrates all the frame structure elements in the embodiment of FIGURE 4 shown in the withdrawn position while FIGURE 7 illustrates the withdrawn position in plan view.

It is to be understood that the inventive concept of the present invention can be carried out by combining the various features shown in the two different embodiments. For example, one could employ telescopic front legs with foldable back legs or vice-versa and any of those combinations could be further combined with either a telescopic or a foldable handle.

It is within the scope of the invention to modify the outer surface of the conventional baby seat to provide a neat overall appearance. For example, side walls may be moulded of a thickness sufficient to receive the frame structure and to include suitable recesses and apertures for so receiving the same. For example, the dotted line 62 in FIGURE 2 represents the outer boundary of a thicker side wall 14 having suitable apertures therein for the elements of telescopic legs 15 and 20 and handle portions 26 and 27.

It is also possible to arrange the handle at any convenient point which does not interfere with movement of the legs, such as is shown in dotted lines at cylinder 28A in FIGURES 1 and 4. With this arrangement no elements move across the upper edge of the side panels except for handle 25 from cylinders 28A. Consequently, it is possible to employ covering walls 50 generally parallel to side panels 13 and 14 but located outwardly therefrom as shown in FIGURES 8 and 9 and connected thereto by connecting portions 51 thereby providing an extremely neat appearance which covers the frame structure in the withdrawn position.

The above embodiments of the invention are preferable since they make it possible to attach known tilting mechanisms to the area behind the back 11. However, it is also within the scope of the invention to mount the frame structure elements behind the back 11 in the withdrawn position.

This latter embodiment is shown in FIGURES 10 and 11. Referring in particular to FIGURE 10 there is shown a front leg structure 55 comprising a pair of front legs 56 connected for pivotal movement about a bar 57, this bar 57 being connected to the back 11. Similarly, there is provided a rear leg structure 65 including rear legs 66 which are pivotable about a rear bar 67 by pivot connections 68.

It will be noted that in FIGURE 10, in the withdrawn position, the wheels 17 and 22 are flat against the outer surface of back 11, whereas in FIGURE 11 the axis of the wheels has been turned 90° to permit suitable forward movement of the baby seat. This may be provided very simply by mounting the wheels on a member which is in turn attached to the main legs 56 or 66 by a notch and detent arrangement permitting two stable orientations of the notch and detent, one in the folded position of FIGURE 10 and the other in the position of FIGURE 11.

To enhance the appearance of this embodiment it would be possible to employ a skirt 70 extending below the side panels 13 and 14 blocking from view the elements of the frame when they are in the withdrawn position.

By way of illustration the invention has been described as if it would be pushed in the direction with the base rearwardmost. However, it will be apparent that the seat could also be pushed with the base forwardmost, in which case the short legs closest to the base would be the "forward" legs and the long legs farthest from the base would be the "rear" legs. This arrangement is illustrated in FIGURE 11 wherein the handle 63 is shown as inclined away from the base 12.

The structure of the present invention can be formed of any suitable materials. For example, towards keeping the baby seat as lightweight as possible, it would be desirable to form the baby seat itself out of plastic in a manner which is now known. The frame structure for the wheel could be formed of a light, strong metal such as aluminum. The handle could be formed of any convenient light material such as either plastic or aluminum.

Although the invention has been described in considerable detail above with respect to preferred embodiments thereof, it is to be understood that the detailed description together with the accompanying drawings are intended merely for purposes of illustration and that the invention is capable of numerous modifications and variations apparent to those skilled in the art without departing from the spirit and scope of the invention.

We claim:

1. In a baby seat of the type comprising a back, a base secured at approximately a right angle to the back and opposed side panels, each connected to both the base and the back to form therewith a recessed seat area, the distance across the base in a direction generally perpendicular to the back being sufficiently small so that the lower portions of a baby's legs can extend freely upwardly beyond the upper edge of the base, and the distance across each side panel in a direction generally perpendicular to the back being greatest near the base and less farther away from the base, the exterior surface of the back, base and side panels form an outer surface, and including a set of frame elements attached to the said baby seat; said set comprising, a front leg and a rear leg attached to each of the side panels, each leg having one end operatively connected to its respective side panel and having a rotating wheel mounted at its other end, each leg being movable at least between an extended position and a withdrawn position, whereat in the extended position the legs extend downwardly from the said outer surface with the wheels outermost so that when the wheels are placed on the ground the baby seat is spaced above the ground for rolling movement of the seat and frame elements therealong, and the two said front legs being longer than the two rear legs so that in the extended position of the legs the back is inclined upwardly from the base and whereat in the withdrawn position the frame elements are located in close proximity to their respective side panels and, as a whole, lie in planes generally parallel to their respective side panels so that the frame elements do not obstruct normal manual carrying of the baby seat, and including a handle having sides connected one to each side panel and a cross piece connecting the side pieces, said handle being movable at least between an extended position whereat the handle extends upwardly away from the baby seat and a withdrawn position whereat at least the said sides of the handle are located in close proximity to, and as a whole lie in planes generally parallel to their respective side panels, and the said sides are located below the upper edges of their respective side panels.

2. The invention as claimed in claim 1 wherein said legs comprises a plurality of telescoping sections, one section being connected to the said baby seat, a wheel connected to the section remote therefrom wherein the sections are movable relative to each other to expand the leg to the extended position and wherein the sections are movable into each other to contract the leg to the withdrawn position.

3. The invention as claimed in claim 1 wherein the hnadle means includes two sets of telescoping portions, one set attached to each of said side panels, the lowermost portion of each set being connected to its respective side panel and the other portion of each set capable of extending upwardly therefrom in the said first position; and means for connecting the two sets together when both are in the said first position.

4. The invention as claimed in claim 1 wherein the handle means includes a pair of rods pivotally connected, one to each of said side panels and means connecting together the ends of the rods remote from the pivots, said rods extending upwardly in the said first position and movable to a position along the two side panels in the said second position.

5. The invention as claimed in claim 1 including a pair of side walls, one generally parallel to each side panel to define a space therewith into which the legs are withdrawn in the said withdrawn position, and including a connecting portion connecting each side panel to its respective side wall.

6. The invention as claimed in claim 1 wherein each side panel is of a thickness greater than that of the frame elements in the withdrawn position, and wherein the side panels include apertures for receiving at least some of the frame elements in the withdrawn position.

7. The invention as claimed in claim 1 wherein at least one of the said legs comprises a rigid portion pivotally connected at its one end to the baby seat and having a wheel connected at its other end, said leg being pivotable about the pivot at said one end to the extended position and to a withdrawn position whereat the leg overlies the said side panels of the baby seat.

8. The invention as claimed in claim 7 wherein the handle means includes two sets of telescoping portions, one set attached to each of said side panels, the lowermost portion of each set being connected to its respective side panel and the other portions of each set capable of extending upwardy therefrom in the said first position; and means for connecting the two sets together when both are in the said first position.

9. The invention as claimed in claim 7, wherein the handle means includes a pair of rods pivotally connected, one to each of said side panels and means connecting together the ends of the rods remote from the pivot, said rods extending upwardly in the said first position and movable to a position along the two side panels in the said second position.

References Cited

UNITED STATES PATENTS

| | | | |
|---|---|---|---|
| 1,693,633 | 12/1928 | Allen | 280—31 |
| 2,731,072 | 1/1956 | Post | 297—255 X |
| 2,969,830 | 1/1961 | Thompson. | |
| 2,990,190 | 9/1961 | Eriksen | 280—30 |
| 3,171,687 | 3/1965 | Jensen | 297—377 |
| 3,206,247 | 9/1965 | Johnson | 297—377 X |
| 3,207,528 | 9/1965 | Hasche | 280—47.38 |
| 3,334,844 | 8/1967 | Gould et al. | 297—377 |

FOREIGN PATENTS 1,112,005  11/1955  France.

KENNETH H. BETTS, Primary Examiner

U.S. Cl. X.R.

280—47.37, 47.4; 297—377

UNITED STATES PATENT OFFICE
CERTIFICATE OF CORRECTION

Patent No. 3,463,504        Dated August 26, 1969

Inventor(s) Marvin Petry and Marilyn Belle Petry

It is certified that error appears in the above-identified patent and that said Letters Patent are hereby corrected as shown below:

Column 1, in the heading, the address of the inventors should read --8720 Harness Trail, Potomac, Maryland, 20854-- and not "10232 Rockville Pike, Rockville, Md., 20853".

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents